United States Patent
Helt

(10) Patent No.: US 9,601,919 B2
(45) Date of Patent: Mar. 21, 2017

(54) TIME DELAY WITH CONTROL VOLTAGE SENSING

(75) Inventor: Robert W. Helt, Westborough, MA (US)

(73) Assignee: Trane International Inc., Piscataway, NJ (US)

( * ) Notice: Subject to any disclaimer, the term of this patent is extended or adjusted under 35 U.S.C. 154(b) by 691 days.

(21) Appl. No.: 13/285,717

(22) Filed: Oct. 31, 2011

(65) Prior Publication Data

US 2013/0107401 A1 May 2, 2013

(51) Int. Cl.
| | |
|---|---|
| H02H 7/09 | (2006.01) |
| H02H 3/247 | (2006.01) |
| H02P 27/00 | (2006.01) |
| B60Q 1/00 | (2006.01) |
| H02P 7/00 | (2016.01) |
| H02H 3/253 | (2006.01) |
| H02H 7/08 | (2006.01) |
| F24F 11/00 | (2006.01) |

(52) U.S. Cl.
CPC .............. *H02H 7/09* (2013.01); *H02H 3/247* (2013.01); *F24F 11/0009* (2013.01); *H02H 3/253* (2013.01); *H02H 7/0805* (2013.01)

(58) Field of Classification Search
USPC ...................................................... 318/400.3
See application file for complete search history.

(56) References Cited

U.S. PATENT DOCUMENTS

| | | | |
|---|---|---|---|
| 5,422,518 A | 6/1995 | Sashida | |
| 5,460,327 A | 10/1995 | Hill et al. | |
| 5,804,999 A | 9/1998 | DeBoer et al. | |
| 7,081,734 B1 * | 7/2006 | Jadric | H02M 7/797 318/767 |
| 7,174,239 B2 | 2/2007 | Butler et al. | |
| 9,062,893 B2 * | 6/2015 | Romanowich | F24F 13/1426 |
| 2003/0128003 A1 * | 7/2003 | Marusarz | H02P 7/0094 318/268 |
| 2005/0212522 A1 * | 9/2005 | Finlay | H02H 3/335 324/509 |
| 2005/0240312 A1 * | 10/2005 | Terry | F24F 11/0086 700/276 |
| 2005/0264217 A1 * | 12/2005 | Huston | B60L 11/1816 315/77 |
| 2007/0283708 A1 * | 12/2007 | Schnetzka | F25B 31/008 62/259.2 |
| 2009/0206818 A1 * | 8/2009 | Horan | H02M 5/257 323/311 |

(Continued)

*Primary Examiner* — Eduardo Colon Santana
*Assistant Examiner* — Said Bouziane
(74) *Attorney, Agent, or Firm* — Conley Rose, P.C.; J. Robert Brown, Jr.; Michael J. Schofield

(57) ABSTRACT

A method is provided for controlling operation of an air conditioning unit. The method comprises supplying line voltage to activate a motor configured to operate the air conditioning unit, and monitoring a supply of control voltage in order to control operation of the air conditioning unit, the supply of control voltage being derived from line voltage. In response to detecting a control voltage below a predetermined threshold and/or by a predetermined percentage, a time delay is initiated. The method further comprises deactivating the motor if a predetermined increase in control voltage is not detected before the time delay expires.

20 Claims, 3 Drawing Sheets

(56) References Cited

U.S. PATENT DOCUMENTS

| | | | |
|---|---|---|---|
| 2011/0031911 A1* | 2/2011 | Marcinkiewicz ... | H02M 1/4225 318/400.3 |
| 2011/0031914 A1* | 2/2011 | Green ................ | H02P 6/20 318/400.11 |
| 2012/0262140 A1* | 10/2012 | Divan ................ | H02M 3/156 323/282 |

\* cited by examiner

TIME DELAY WITH CONTROL VOLTAGE SENSING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilating, and air conditioning (HVAC) systems commonly employ units such as condensers and compressors for performing applications such as cooling and heating air. Compressors are typically driven by induction motors that operate using power supplied from an electrical grid via power lines. During peak periods in which the overall demand for power is relatively high, the electrical grid voltage may be reduced. In brownout situations, for example, the supply of voltage across power lines may be significantly reduced as an attempt to prevent blackouts. If a compressor is forced to operate at reduced voltage levels for a prolonged duration, the compressor may eventually stall. In this case, the compressor draws higher current, thereby increasing the operating temperature while reducing the line voltage (e.g., from about 240 volts to about 170 volts).

To protect the compressor from damage due to thermal overload conditions, a protection device may be configured to deactivate the compressor. However, the time necessary to trigger such protection devices may be multiplied when compressors stall at reduced line voltages such as 170 volts or less. For instance, it may take a protection device about three to five times longer to trip the compressor in these situations, and therefore, the protection device may be unable to prevent thermal damage to the compressor.

Furthermore, when multiple compressors go offline due to situations such as brownouts, many of the compressors may return online at similar times. In such situations, the compressors may draw substantial quantities of current, thereby reducing the line voltage as described above. As a result, widespread power outages may occur if the electrical grid cannot satisfy the overall demand. Similarly, when compressors attempt to simultaneously return online once power is restored following a blackout, a subsequent blackout may occur due to the excessive power demanded to restart the compressors.

SUMMARY OF THE DISCLOSURE

An embodiment of the present disclosure comprises a heating, ventilating, and air conditioning (HVAC) system including a power source operable to supply line voltage for operating a motor. The power source is electrically coupled to a transformer that is operable to convert line voltage to control voltage used to selectively energize at least one switching element. When energized, the switching element electrically connects the motor to line voltage. At least one sensor may be provided for monitoring control voltage supplied from the transformer. The system further includes a controller operatively connected to the sensor and operable to control line voltage supplied to the motor via the switching element in accordance with control voltage supplied from the transformer. The controller is configured to initiate a time delay in response to the sensor detecting a reduction causing control voltage to decrease below a predetermined threshold and/or by a predetermined percentage. The controller is further configured to transmit a command to de-energize the switching element in order to discontinue operation of the motor if the sensor does not detect a predetermined increase in control voltage before the time delay expires.

Another embodiment of the present disclosure comprises a method for controlling operation of an air conditioning unit. The method includes supplying line voltage to activate a motor configured to operate the air conditioning unit, and monitoring a supply of control voltage in order to control operation of the air conditioning unit, the supply of control voltage being derived from line voltage. In response to detecting a control voltage below a predetermined threshold and/or by a predetermined percentage, a time delay is initiated. The method further includes deactivating the motor if a predetermined increase in control voltage is not detected before the time delay expires.

Yet another embodiment of the present disclosure comprises a circuit for controlling operation of an air conditioning unit. The circuit includes a low voltage source operable to selectively energize at least one switching element, which electrically connects a motor to a supply of line voltage when the switching element is energized. The switching element may be energized in response to a thermostat calling for the air conditioning unit to perform a cooling operation. The circuit further includes at least one sensor operable to monitor control voltage supplied from the low voltage source, wherein the control voltage is proportional to line voltage. A controller is operatively connected to the sensor and operable to control the supply of line voltage to the motor in accordance with control voltage supplied from the low voltage source. The controller is configured to initiate a time delay in response to the sensor detecting a predetermined reduction in control voltage. The controller is further configured to transmit a command to de-energize the switching element in order to discontinue operation of the air conditioning unit if the sensor does not detect a predetermined increase in control voltage before the time delay expires. These and other features will be more clearly understood from the following detailed description taken in conjunction with the accompanying drawings and claims.

BRIEF DESCRIPTION OF THE DRAWINGS

The drawings described herein are merely for purposes of illustration and are not intended to limit the scope of the present disclosure in any way.

Herein, like elements and features are marked throughout the disclosure and drawings with the same reference numerals, respectively.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for controlling operation of an air conditioning unit. In an embodiment, the system comprises a controller configured to monitor a supply of control voltage that is derived from line voltage, which supplies power to a motor. In response to detecting a reduction in control voltage, the controller may deactivate the motor if an increase in control voltage is not detected within a predetermined duration such as 3 to 5 line cycles or 25 to 50 milliseconds (ms). If deactivated, the controller may impose a random time delay before reactivating the motor.

Figure 1:
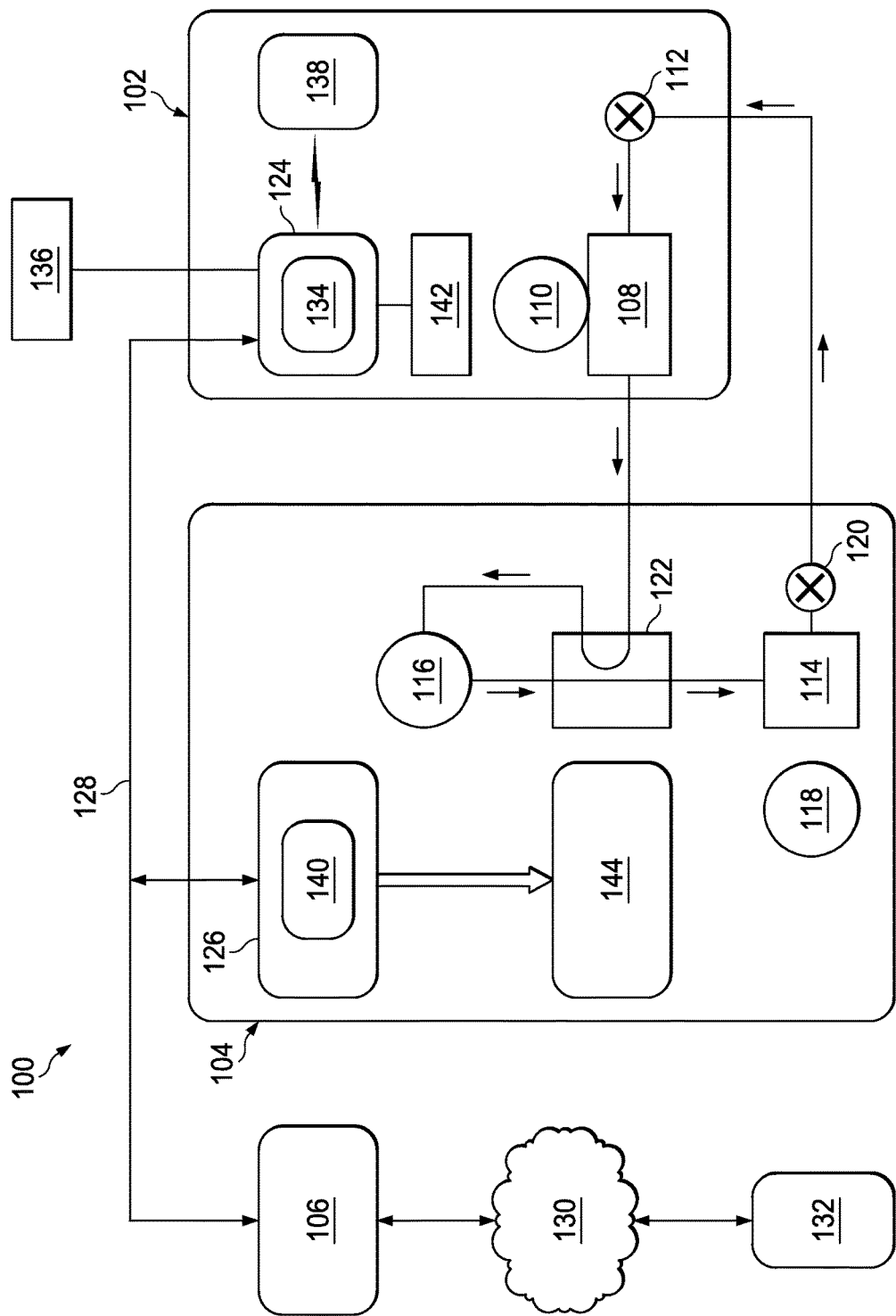
FIG. 1 is a simplified schematic diagram of an HVAC system according to an embodiment of the disclosure.

Referring to FIG. 1, a simplified schematic diagram of a heating, ventilating, and air conditioning (HVAC) system 100 according to an embodiment of the present disclosure is shown. The HVAC system 100 comprises an indoor unit 102, an outdoor unit 104, and a system controller 106, which may be configured to control operation of the indoor unit 102 and/or the outdoor unit 104. The HVAC system 100 may generally be described as a heat pump system that selectively operates to implement one or more substantially closed thermodynamic refrigeration cycles to provide a cooling and/or heating functionality.

The indoor unit 102 may comprise an indoor heat exchanger 108, an indoor fan 110, and an indoor metering device 112. In one aspect, the indoor heat exchanger 108 may be a plate fin heat exchanger configured to allow heat exchange between refrigerant carried within internal tubing of the indoor heat exchanger 108 and fluids that contact the indoor heat exchanger 108 but that are kept segregated from the refrigerant. In other aspects, the indoor heat exchanger 108 may comprise a spine fin heat exchanger, a microchannel heat exchanger, or any other suitable type of heat exchanger.

In an embodiment, the indoor fan 110 may be a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. Additionally or alternatively, the indoor fan 110 may be configured as a modulating and/or variable speed fan capable of being operated at many speeds over one or more ranges of speeds. In one aspect, the indoor fan 110 may be configured as a multi-speed fan capable of being operated at a plurality of operating speeds. For example, the indoor fan 110 may selectively power different windings selected from multiple electromagnetic windings of a motor that drives the indoor fan 110. In other aspects, the indoor fan 110 may be a single-speed fan.

In an embodiment, the indoor unit 102 may comprise a metering device 112, which may include an electronically controlled electronic expansion valve (EEV) driven by a motor. In some aspects, the indoor metering device 112 may include a thermostatic expansion valve, a capillary tube assembly, and/or any other suitable metering device. Additionally or alternatively, the indoor metering device 112 may comprise and/or be associated with a refrigerant check valve and/or a refrigerant bypass for use when a direction of refrigerant flow through the indoor metering device 112 is such that the indoor metering device 112 is not intended to meter or otherwise substantially restrict flow of the refrigerant through the indoor metering device 112.

The outdoor unit 104 may comprise an outdoor heat exchanger 114, a compressor 116, an outdoor fan 118, an outdoor metering device 120, and a reversing valve 122. The outdoor heat exchanger 114 may be a micro-channel heat exchanger configured to allow heat exchange between refrigerant carried within internal passages of the outdoor heat exchanger 114 and fluids that contact the outdoor heat exchanger 114 but are kept segregated from the refrigerant. In other implementations, the outdoor heat exchanger 114 may comprise a spine fin heat exchanger, a plate fin heat exchanger, or any other suitable type of heat exchanger.

In an embodiment, the compressor 116 may be a multi-speed scroll type compressor configured to selectively pump refrigerant at a plurality of mass flow rates. In some aspects, the compressor 116 may comprise a modulating compressor capable of operating over one or more speed ranges. Further still, the compressor 116 may comprise a reciprocating type compressor, a single speed compressor, and/or any other suitable refrigerant compressor and/or refrigerant pump.

In an embodiment, the outdoor fan 118 may be an axial fan comprising a fan blade assembly and a fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 may be configured as a modulating and/or variable speed fan capable of running at many speeds over one or more speed ranges. Analogous to the indoor fan 110, the outdoor fan 118 may be configured as a multi-speed fan capable of running at a plurality of operating speeds. In other embodiments, the outdoor fan 118 may be a single speed fan.

In an embodiment, the outdoor metering device 120 may be a thermostatic expansion valve. In other embodiments, the outdoor metering device 120 may comprise an electronically controlled motor driven EEV, a capillary tube assembly, and/or any other suitable metering device. Analogous to the indoor metering device 112, the outdoor metering device 120 may comprise and/or be associated with a refrigerant check valve and/or refrigerant bypass for use when a direction of refrigerant flowing through the outdoor metering device 120 is such that the outdoor metering device 120 is not intended to meter or substantially restrict the flow of refrigerant.

In an embodiment, the reversing valve 122 may be a so-called four-way reversing valve. The reversing valve 122 may be selectively controlled to alter a path of refrigerant flowing in the HVAC system 100. Additionally or alternatively, the reversing valve 122 may comprise an electrical solenoid and/or other suitable device (e.g., electromagnetic actuators and switches) configured to selectively move a component of the reversing valve 122 between operational positions.

In an embodiment, the system controller 106 may comprise a graphical user interface (GUI) for displaying information and for receiving user inputs. The system controller 106 may display information related to the operation of the HVAC system 100 and may receive user inputs related to operation of the HVAC system 100. The system controller 106 may further be operable to display information and receive user inputs tangentially and/or unrelated to operation of the HVAC system 100. Moreover, the system controller 106 may selectively communicate with an indoor controller 124 of the indoor unit 102, with an outdoor controller 126 of the outdoor unit 104, and/or with other components of the HVAC system 100.

In an embodiment, the system controller 106 may be configured for selective bidirectional communication over a communication bus 128. In one aspect, portions of the communication bus 128 may comprise a single- or multi-wire connection suitable for communicating messages between the system controller 106 and one or more of the HVAC system 100 components interfaced to the communication bus 128. Moreover, the system controller 106 may be configured to selectively communicate with HVAC system 100 components and/or other communication devices 132 via a communication network 130. For example, the communication network 130 may comprise a telephone network and a communication device 132 may comprise a telephone. Additionally or alternatively, the communication network 132 may comprise or be communicatively linked to the Internet. Furthermore, the communication devices 130 may comprise a so-called smartphone and/or any other suitable mobile telecommunication device.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. Similarly, the indoor controller 124 may be configured to communicate with an indoor fan controller 142 and/or otherwise affect control over operation of the indoor fan 110. Furthermore, the indoor personality module 134 may comprise information related to the identification and/or operation of the indoor unit 102.

In some embodiments, the indoor EEV controller 138 may be configured to receive information regarding temperatures and pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104.

In an embodiment, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the indoor metering device 112, and/or a position of the outdoor metering device 120.

In some embodiments, the outdoor controller 126 may communicate with a compressor drive controller 144 that is configured to electrically power and/or control the compressor 116. In some embodiments, the outdoor controller 126 and the compressor drive controller 144 may be integrated as a single unit capable of singularly performing the same functionality as each controller 126 and 144.

In some embodiments, the indoor controller 124 may be configured to communicate with and/or otherwise control operation of the compressor 116. For example, the indoor controller 124 may be configured for connection with the compressor 116 via low voltage control wiring that may be used to affect a power level of the compressor 116 (or motor thereof). In other embodiments, the compressor 116 may be configured for communication with the system controller 106 via the indoor controller 124, via the communication bus 128, and/or any other suitable device and/or communication medium so that the system controller 106 may communicate with and/or otherwise control operation of the compressor 116. Of course, in alternative embodiments, the compressor 116 and/or the indoor fan 110 may be controlled by any other suitable component and/or via any suitable communication medium.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may be pumped from the outdoor heat exchanger 114 to the indoor metering device 112 through and/or around the outdoor metering device 120 such that the flow of refrigerant in the cooling mode is not substantially impede. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to gaseous phase. The gaseous phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108. The refrigerant may thereafter reenter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
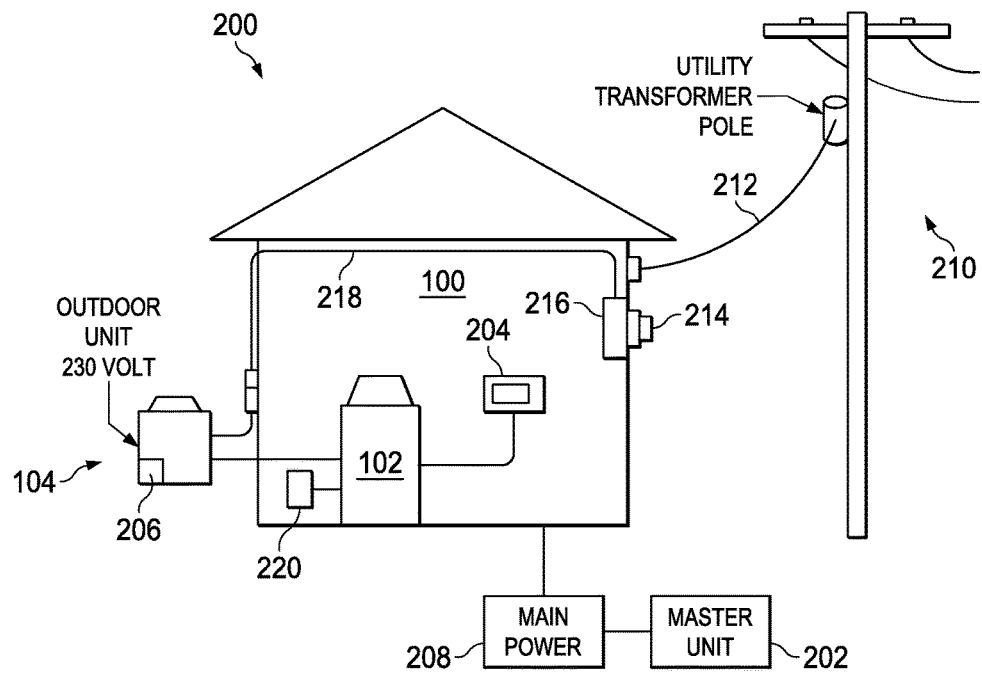
FIG. 2 is a simplified schematic diagram of a dwelling conditioned by an HVAC system according to FIG. 1.

Referring now to FIG. 2, a cutaway of a conventional residential dwelling is illustrated and designated generally as 200. While the present disclosure may specifically refer to a dwelling 200, those of ordinary skill in the art will understand that the teachings disclosed herein may apply to any suitable structure. The dwelling 200 is air conditioned by the HVAC system 100, which is generally shown as a so-called split system comprising an indoor unit 102 located separately from the outdoor unit 104. In alternative embodiments, the HVAC system 100 may comprise a so-called package system in which one or more of the components of the indoor unit 102 and one or more of the components of the outdoor unit 104 are carried together in a common housing or package. The HVAC system 100 may also comprise a so-called ducted system where the indoor unit 102 is located remote from the conditioned zones, thereby requiring air ducts to route circulating air. Alternatively, the HVAC system 100 may be configured as a non-ducted system in which an indoor unit 102 and/or multiple indoor units 102 associated with an outdoor unit 104 is/are located substantially in the space and/or zone to be conditioned by the respective indoor unit(s) 102.

In an embodiment, the HVAC system 100 may comprise a master control unit 202. In some implementations, the master control unit 202 may comprise and/or be operatively connected to the system controller 106, the indoor controller 124, and/or outdoor controller 126. The master control unit 202 may be operatively connected to at least one thermostat 204 disposed throughout one or more zones within the dwelling 200. In some embodiments, a thermostat 204 may comprise a graphical user interface (GUI) for allowing a user to control one or more environmental settings for a zone in which the thermostat 204 is located and/or configured to control. As skilled artisans will readily appreciate, thermostats 204 may communicate (e.g., wirelessly or via conductors) with the master control unit 202 to control temperature, humidity, and/or other environmental settings within the corresponding zone. When environmental settings require modification, the master control unit 202 may communicate control signals to the indoor and/or outdoor air conditioning units 102 and 104 in order to control the HVAC system 100 accordingly.

Briefly, for example, when a thermostat 204 indicates that temperature within a zone exceeds a setpoint, the master control unit 202 (or other suitable component associated with the indoor air conditioning unit 102) may transmit a control signal to the outdoor control unit 104 in order to activate a device such as the compressor 116 depicted in FIG. 1. The control signal may be applied to energize a contactor or relay 206 for allowing power to flow to a motor that drives the compressor, which may responsively supply refrigerant for cooling the zone in question. The power to generate the control signal that initiates activation of the compressor may be derived from a transformer commonly employed in HVAC systems to convert nominal line voltage into a reduced voltage used to energize low-voltage devices such as a 24-volt thermostat.

In an embodiment, the master control unit 204 includes or is operatively connected to a primary power source 208. The primary power source 208 may be configured to supply power such as line voltage to operate the indoor and/or outdoor air conditioning units 102 and 104. Of course, components associated with the indoor and outdoor air conditioning units 102 and 104 may demand different ranges of power. For instance, small indoor air conditioning units (e.g., thermostat 204) may have relatively low power ratings (e.g., 12 to 24 volts), whereas larger indoor and/or outdoor air conditioning units (e.g., compressor 116) may have relatively high power ratings (e.g., 220 to 240 volts). Therefore, the primary power source 208 may comprise and/or be electrically connected to a step down transformer configured to provide reduced voltage to low-voltage devices.

The primary power source 208 may be operatively connected to an electrical grid, such as one conventionally employed by electric utilities for distributing power throughout a region. In FIG. 2, for example, an electrical grid may distribute power through a pole-mounted transformer 210 configured to supply power to structures such as the dwelling 200 via one or more power lines 212. The supply of power to the dwelling 200 may be monitored by an electricity meter 214 operatively connected to at least one distribution board 216 or panel associated with the dwelling 200. The distribution board 216 may be implemented as part of an overall power distribution network configured to distribute power to various circuits connected to the primary power source 208, e.g., via electrical wires 218, power outlets 220, etc.

As those of ordinary skill in the art will understand, line voltage may fluctuate or cut out for a variety of reasons. During periods of high power demand, for example, line voltage across an electrical grid may be reduced as part of a brownout. In some instances, line voltage may be temporarily interrupted due to a transmission line (e.g., power line 212) being shorted such as by a tree limb. A temporary power interruption may cause a compressor to slow down and attempt to restart once power is restored. In cases where multiple compressors are similarly affected, a substantially large quantity of current may be drawn if many of the compressors attempt to restart at similar times (e.g., immediately or shortly after power returns). Consequently, the line voltage may significantly decrease (e.g., from about 230 to 170 volts or less), which will cause an increase in the amount of current drawn by the compressors. Moreover, if an attempt to restart a compressor occurs before system pressures have stabilized, the compressor motor may stall, which also increases current consumption. Furthermore, a power outage may eventually occur if the electrical grid cannot satisfy the overall demand for operating the compressors, as may be the case if the line voltage is reduced for a prolonged period (e.g., during a brownout).

Figure 3:
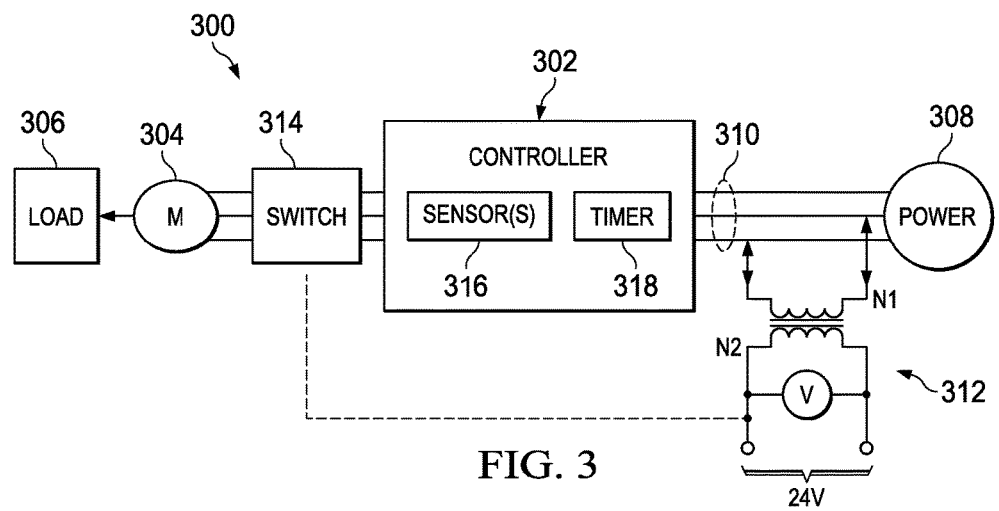
FIG. 3 is a simplified schematic diagram of a control circuit for controlling the supply of power to an air conditioning unit associated with the HVAC system.

Referring now to FIG. 3, a control circuit 300 is depicted for controlling operation of a load based on variations in line voltage. In an embodiment, the control circuit 300 may be configured to control the supply of power to a power-receiving device known to consume relatively large quantities of energy. As discussed further below, the control circuit 300 may deactivate such a device in response to detecting certain variations in line voltage that are indicative of a brownout, an imminent power outage, or other events in which the device may otherwise operate at reduced line voltage. For purposes of discussion, the control circuit 300 will be described herein with respect to an air conditioning unit such as a compressor. It is to be understood, however, that the control circuit 300 is not limited to air conditioning units. In other implementations, the control circuit 300 may be configured to control any suitable device that operates off of high power, such as, but not limited to, one or more furnaces, blowers, refrigerators, high-voltage motors, industrial machines, etc.

The control circuit 300 may comprise a control unit such as a power controller 302, which is operatively connected to a motor 304 configured to drive a compressor 306. Those versed in the art will understand that the compressor 306 may be driven by any suitable motor 304 such as, but not limited to, a single- or multi-phase AC induction motor. In some embodiments, the motor 304 may be a variable speed motor and configured to serially communicate with the power controller 302 by way of a single- or multi-wire interface. The motor 304 may also be a so-called constant torque type motor in which case the power controller 302 may be operable to select a constant torque setting from a plurality of available settings. Still further, the motor 304 may be a so-called permanent split capacitor (PSC) motor in which case the power controller 302 may be operable to select one of three motor speeds and provide a signal for controlling the operation of one or more relays and/or contactors.

Compressors of the type described herein typically operate using AC power derived from nominal line voltage ranging from about 100 to 240 volts. In an embodiment, such power may be provided by a high-voltage source 308 operatively connected to an electrical grid (e.g., via power lines 212). In some implementations, the high-voltage source 308 may comprise or be operatively connected to the primary power source 208 shown in FIG. 2. The high-voltage source 308 is configured to supply line voltage to devices such as the motor 304 via one or more power lines 310. While the high-voltage source 308 is shown in FIG. 3 as being implemented in a three-phase power supply system, in other embodiments the high-voltage source 308 may be implanted in a single-phase system or in an alternative type of multi-phase system.

In some embodiments, the control circuit 300 may comprise a transformer 312 including a primary winding N1 electrically coupled across the power lines 310. The transformer 312 may be a step down that is operable to convert a primary voltage to a lower secondary voltage. In one aspect, the transformer 312 may be a so-called control voltage transformer that is operable to reduce a primary voltage such as line voltage to a low secondary voltage commonly known as control voltage. Reduced control voltage derived from a secondary winding N2 of the transformer 312 may generally be proportional to the line voltage. As previously mentioned, the transformer 312 may supply reduced control voltage to low-voltage devices such as thermostats, contactors, relays, etc. The transformer 312 may be configured to provide reduced control voltage on the order of about 18 to 30 VAC, which typically comprises the normal operating range for such low-voltage devices.

In an embodiment, when the indoor air conditioning unit 102 calls for cooling, the transformer 312 may convert relatively high line voltage (e.g., 120 or 240 VAC) at the power lines 310 to a low control voltage (e.g., 12 or 24 VAC). This low control voltage may be applied to energize a switching element 314 such as a relay coil, thereby allowing power to flow to the motor 304 to activate the compressor 306. To deactivate the compressor 306 (e.g., if cooling is no longer necessary or for safety purposes such as overheating), the switching element 314 may be shifted to an open position to de-energize the relay coil, thereby restricting the flow of power to the motor 304. The switching element 314 may comprise any suitable circuitry for permitting and restricting the flow of power to the motor 304. Without limitation, such circuitry may include one or more electromagnetic elements (e.g., relays, contacts, coils, etc.), bidirectional switching devices, and/or semiconductor-controlled devices such as thyristors, e.g., silicon-controlled rectifiers (SCRs), triode AC switches (TRIACs), etc.

In an embodiment, the power controller 302 may comprise or be operatively connected to at least one sensor 316 for measuring line voltage, which may be supplied over the power lines 310 by the high-voltage source 308. As described below, the power controller 302 may deactivate the compressor 306 in response to the sensor 316 detecting a reduction in line voltage. In some embodiments, the compressor 306 may be deactivated only if one or more conditions are satisfied. A condition for deactivating the compressor 306 may be based on various factors such as the magnitude of a power reduction and/or the duration of a power interruption.

In an embodiment, the power controller 302 may initiate deactivation of the compressor 306 in response to detecting a power interruption that causes line voltage to drop by a predetermined percentage or below a predetermined threshold. According to one aspect, the threshold for deactivating the compressor 306 may be based on voltage levels at which the compressor 306 may safely and/or efficiently operate. For example, if the normal operating range of the compressor 306 is about 180 to 240 volts, the motor 304 may be more likely to stall and/or overheat when operating at a voltage below 180 volts. Accordingly, the predetermined threshold in this case may be set at about 170 or 180 volts. In other cases, however, the predetermined threshold may be lower or higher, e.g., depending on various factors such as power requirements, operating conditions, compressor type, etc.

In some embodiments, the sensor 316 may be configured to monitor low control voltage derived from the transformer 312. As previously mentioned, secondary voltage derived from the transformer 312 may be proportional to the primary line voltage. Accordingly, the power controller 302 may determine whether to deactivate the motor 304 based on control voltage measurements at the secondary or low-voltage side of the transformer 312. This implementation may be useful in an HVAC system 100 where it might be relatively difficult and/or costly to establish a suitable connection for sensing line voltage.

In an embodiment, the power controller 302 may control operation of the compressor 306 based on control voltages used to energize one or more switching elements 314 such as relay coils that control the supply of power to the motor 304. In one aspect, the compressor 106 may be deactivated by de-energizing a corresponding relay coil 314 in response to detecting a control voltage falling below a predetermined threshold. For example, in situations where it may be unsuitable to operate the compressor 306 at a voltage below 170 volts, the power controller 302 may deactivate the motor 304 in response to detecting a control voltage falling below 19 or 17 volts (control voltages between 17 and 19 volts are approximately equivalent to about 170 volts of line voltage). In other aspects, the motor 304 may be deactivated in response to detecting a variation that causes control voltage to drop by a predetermined percentage. For example, drop-out voltages for a 24-volt relay coil comprise 25-60% of rated voltage or 6 to 15 volts.

In some instances, a reduction in line voltage may be of a relatively short duration. For example, an electrical grid may experience momentary drops in voltage such as voltage sags that last for about 2 to 6 line cycles, or about 35 to 120 milliseconds (ms). Depending on certain factors, such short-term power interruptions may not pose the types issues that can result when compressors operate off of reduced line voltage for a prolonged duration (e.g., during brownouts). Moreover, deactivating compressors when a reduction in line voltage is of a relatively short duration may reduce overall efficiency and/or pose a nuisance to homeowners. When a compressor is deactivated, for example, a predetermined time delay (e.g., 5-7 minutes) may be imposed before reactivating the compressor. A time delay of this sort may be necessary to allow system pressures to sufficiently stabilize, thereby reducing the possibility of the motor stalling and/or overheating due to high current being drawn when reactivated.

In an embodiment, the compressor 306 may be configured to continue operating for at least a short duration when a temporary interruption in line voltage is identified. As discussed above, the sensor 316 may monitor power supplied from the high-voltage source 308 or power supplied from the low-voltage side of the transformer 312. For purposes of convenience only, the following discussion may herein focus more on an implementation in which the sensor 316 measures the low control voltages derived from the secondary winding N2 of the transformer 312. Nonetheless, it is to be understood that the following discussion is similarly applicable to implementations in which line voltage is monitored. In one implementation, for example, the control circuit 300 may comprise at least one sensor for monitoring line voltage and at least one sensor for monitoring control voltage. Accordingly, the power controller 302 may be configured to determine whether to deactivate the motor 304 based on fluctuations in line voltage and/or control voltage that result in a reduced voltage. Unless otherwise stated, a "reduced voltage" and/or "low operating voltage" may herein refer to line voltage or control voltage that falls below a predetermined threshold and/or by a predetermined threshold.

In some embodiments, the power controller 302 may comprise or be operatively connected to one or more timers 318. In one aspect, a timer 318 may be activated in response to a fluctuation in power that causes a reduced voltage. Activation of the timer in such cases may occur automatically or in response to receiving a signal from the power controller 302 or other suitable component. Once the timer 318 is activated, the sensor 316 may continuously monitor control or line voltage for a preset time. If the monitored voltage remains below a predetermined threshold and the preset time elapses, the power controller 302 may automatically deactivate the motor 304. The preset time may be based on a duration in which continued operation of the compressor 306 at the reduced voltage is deemed tolerable. In an exemplary embodiment, the preset time is of a duration that is not so short so as to result in excessive nuisance tripping, while not so long so as to result in stalling of the motor 304. In some cases, the preset time may vary due to factors such as, but not limited to, the magnitude of the voltage drop, the current operating temperature, the duration in which the motor 304 has been operating the compressor 306, the rate/frequency in which a voltage line drops below normal operating levels, etc.

In an embodiment, the preset time may comprise an interval ranging from about 2 to 6 line cycles and/or a duration lasting about 35 to 120 milliseconds (ms). In one aspect, the power controller 302 may automatically deactivate the motor 304 if the control or line voltage does not sufficiently increase (e.g., by a certain percentage or above a predetermined threshold) within 50 ms or less. Additionally or alternatively, the motor 304 may be deactivated if the control or line voltage does not sufficiently increase within 5 line cycles. In some cases, the power controller 302 may deactivate the motor 304 if the control or line voltage does not sufficiently increase within 3 line cycles. Accordingly, the sensor 316 may be configured to measure voltage very rapidly in response to detecting a variation causing the compressor 306 to operate at reduced line voltage. In some aspects, the sensor 316 may measure control or line voltage on a per-cycle basis. In other aspects, the sensor 316 may measure control or line voltage every two line cycles.

In some embodiments, if the control or line voltage increases above a predetermined threshold and/or by a predetermined percentage within a first preset time, the timer 318 may automatically reset and resume a new cycle for monitoring the power supply in question. For example, the sensor 316 may continue sensing voltages in similar time increments (e.g., every one or two cycles) for a second preset time, which may be the same as or different than the first preset time. In one aspect, the first preset time may be set for about 5 line cycles, whereas the second preset time may be set for about 3 line cycles. In other aspects, the second preset time may be equal to or longer than the first preset time. In any case, the sensor 316 is operable to sense voltage very rapidly such that the power controller 302 may quickly determine whether to continue or discontinue operation of the motor 304 when a fault is detected. The sensor 316 may conduct voltage measurements during a first preset time in order to avoid nuisance tripping in instances where a voltage supply quickly increases (e.g., in 5 line cycles or less) following a power interruption. The sensor 316 may conduct similar voltage measurements in order to ensure that an increase is not merely a temporary spike in which voltage quickly decreases to a level in which the motor 304 is more inclined to stall.

In an embodiment, if a variation causes control or line voltage to drop to a reduced voltage, the power controller 302 may transmit a signal that de-energizes the switching element 314 if the voltage does not rise above a predetermined threshold and/or by a predetermined percentage within about 50 ms or 5 line cycles or less. In turn, the supply of power to the motor 304 will be interrupted, thereby discontinuing operation of the compressor 306. After deactivating the motor 304, one or more sensors 316 may monitor the control voltage and/or line voltage in order to determine whether sufficient power is available for restarting the compressor 306.

In one aspect, the power controller 302 may reactivate the motor 304 when the sensor 316 detects a minimum voltage. In some cases, the minimum voltage may include a control voltage of about 17 to 19 volts or a line voltage of about 170 to 180 volts. In other cases, the minimum voltage may be higher to account for the high current that is drawn when the motor 304 restarts. For instance, the minimum voltage may include a control voltage of about 18 to 24 volts or a line voltage of about 180 to 240 volts. In some aspects, the power controller 302 may be configured to reactivate the motor 304 only if the control or line voltage remains equal to or above a predetermined voltage for a minimum duration. Additionally or alternatively, the power controller 302 may determine whether to reactivate the motor 304 based on averaging control or line voltage values sensed during a preset time. For instance, the power controller 302 may reactivate the motor 304 after the preset time if the average control voltage is equal to or above about 18 volts and/or if the average voltage line is equal to or about 180 volts. In other aspects, the average thresholds for may be higher or lower.

In some embodiments, once the necessary power requirements and/or timing constraints for reactivating the motor 304 are satisfied, a randomized time delay may be imposed. As previously mentioned, an electrical grid may experience power failures that result in many compressors becoming deactivated. If a large number of compressors attempt to restart once power on the electrical grid is restored, the line voltage may be reduced due to the compressors consuming substantial quantities of current. For instance, the line voltage may fall from about 230 to 170 volts or less, in which case a subsequent power failure may ensue. To minimize this possibility, randomized time delays may be generated by control circuits as disclosed herein, such that multiple compressors do not restart at similar times when power returns after an outage. In some aspects, the power controller 302 may instruct a timer 318 to generate a random time delay, or a timer 318 may automatically generate a time delay once the power returns.

In some embodiments, the power controller 302 may comprise and/or be operatively connected to one or more controllers described herein, e.g., system controller 106, master control unit 202, etc. For instance, the control circuit 300 may be incorporated with a component such as the indoor air conditioning unit 102 or the outdoor conditioning unit 104. As such, the power controller 302 may comprise and/or be operatively connected to controllers such as the indoor controller 124 or outdoor controller 126, respectively. In some cases, it may be more convenient to incorporate the control circuit 300 with a unit in which the control circuit 300 is configured to control. In the present example, for instance, it might be more convenient to integrate the control circuit 300 in a circuit board for the outdoor air conditioning unit 104 since it comprises a compressor 116. In other cases, the control circuit 300 may be provided as an independent unit that forms part of the HVAC system 100. In an embodiment, the control circuit 300 may be incorporated in a unit that is implemented as a brushless variable AC and/or DC unit.

Figure 4:
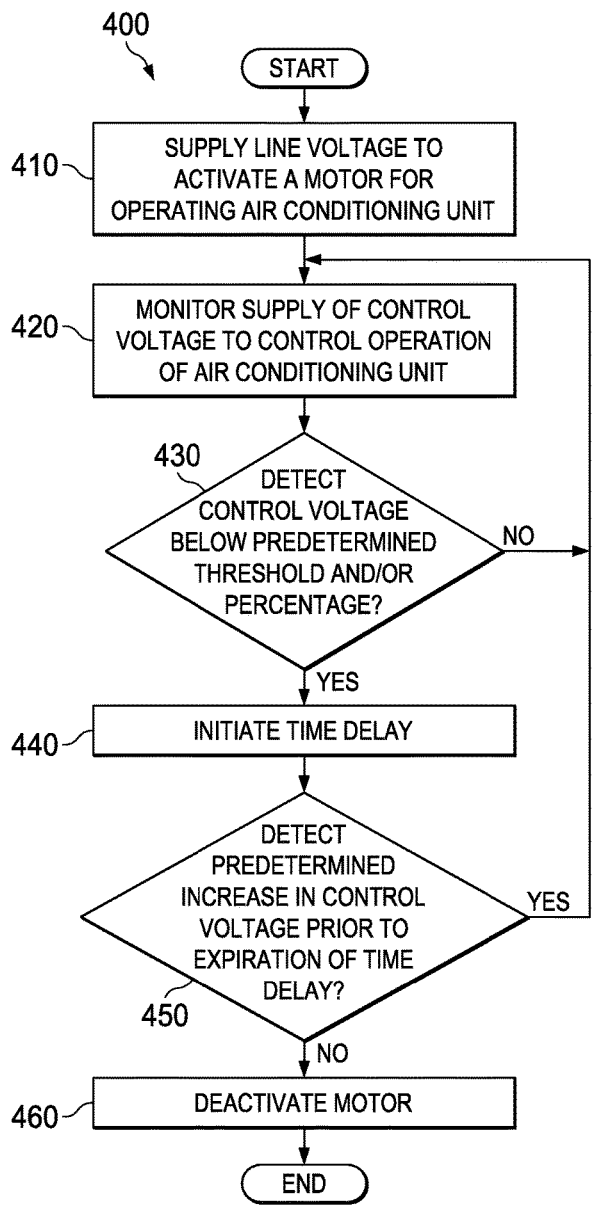
FIG. 4 is a simplified flowchart of a method for controlling the supply of power to an air conditioning unit according to an embodiment of the disclosure.

Referring now to FIG. 4, a simplified flowchart of a method 400 of controlling a power supply for an air conditioning unit is shown. At block 410, line voltage is supplied to activate a motor configured to operate the air conditioning unit. At block 420, a supply of control voltage is monitored in order to control operation of the air conditioning unit, wherein the supply of control voltage is derived from line voltage. At block 430, the method 400 determines whether a control voltage below a predetermined threshold and/or by a predetermined percentage is detected. If not, the method 400 continues to monitor the supply of control voltage at block 420. If so, the method 400 proceeds to initiate a time delay at block 440. At block 450, the method 400 determines whether a predetermined increase in control voltage is detected before the time delay expires. If so, the method 400 continues to monitor the supply of control voltage at block 420. If not, the method 400 proceeds to deactivate the motor at block 460.

In some embodiments, one or more aspects of the methods described herein may be performed at least partially by the system controller 106, the indoor controller 124, the outdoor controller 126, the master control unit 202, the control circuit 300, and/or any other suitable components.

Figure 5:
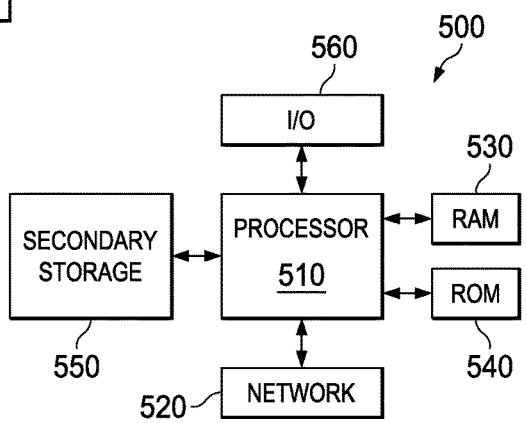
FIG. 5 illustrates a general-purpose computer system suitable for implementing the embodiments of the present disclosure.

Referring now to FIG. 5, the HVAC system 100 may comprise one or more processing components capable of executing instructions related to the methods and/or operation described herein. The processing component may be a component of a computer system. FIG. 5 illustrates a typical, general-purpose processor (e.g., electronic controller or computer) system 500 that includes a processing component 510 suitable for implementing one or more embodiments disclosed herein. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by the processor 520 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, a transceiver might be considered to be a component of the I/O devices 560 instead of or in addition to being a component of the network connectivity devices 520. Some or all of the I/O devices 560 may be substantially similar to various components depicted in the previously described.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A heating, ventilating, and air conditioning (HVAC) system, comprising:
a power source operable to supply an alternating current (AC) line voltage for operating a motor;
a transformer electrically coupled to the power source and operable to convert the AC line voltage to an AC control voltage used to selectively energize at least one switching element, the switching element electrically connecting the motor to the AC line voltage when the switching element is energized;
at least one sensor operable to monitor the AC control voltage supplied from the transformer; and
a controller operatively connected to the sensor and operable to control the AC line voltage supplied to the motor via the switching element in accordance with the AC control voltage supplied from the transformer;
wherein the controller is configured to initiate a time delay in response to the sensor detecting a reduction in the AC control voltage below a predetermined threshold and/or by a predetermined percentage;
wherein the controller is configured to transmit a command to de-energize the switching element in order to discontinue operation of the motor at the expiration of the time delay in response to the sensor not detecting a predetermined increase in the AC control voltage before the time delay expires; and wherein, after expiration of the time delay and discontinuing operation of the motor, the controller is configured to initiate a randomly generated time delay and transmit a command to re-energize the switching element in order to restart operation of the motor at the expiration of the randomly generated time delay in response to the sensor detecting a predetermined minimum AC control voltage that exceeds a minimum startup voltage for a predetermined time duration.

2. The HVAC system of claim 1, wherein the time delay comprises an interval between 3 to 5 line cycles.

3. The HVAC system of claim 1, wherein the time delay is less than or equal to 50 milliseconds (ms).

4. The HVAC system of claim 3, wherein the controller is configured to automatically cause the switching element to de-energize if the sensor does not detect that the AC control voltage is greater than or equal to 18 volts before the time delay expires.

5. The HVAC system of claim 4, wherein the sensor continuously measures the AC control voltage every one or two line cycles during the time delay.

6. The HVAC system of claim 1, wherein the controller is configured to initiate reactivation of the motor in response to the sensor detecting that the AC control voltage is greater than or equal to 18 volts for a minimum duration.

7. The HVAC system of claim 6, wherein when the sensor detects that the AC control voltage is at least 18 volts of control voltage for the minimum duration, the controller is configured to re-energize the switching element such that the motor is not reactivated until the randomly generated time delay elapses.

8. A method for controlling operation of an air conditioning unit, comprising:
supplying an alternating current (AC) line voltage to activate a motor configured to operate the air conditioning unit;
monitoring a supply of an AC control voltage with at least one sensor in order to control operation of the air conditioning unit, the supply of the AC control voltage being derived from the AC line voltage;
initiating a time delay in response to detecting by the at least one sensor that the AC control voltage has fallen below a predetermined threshold and/or reduced by a predetermined percentage;
deactivating the motor in response to the at least one sensor not detecting a predetermined increase in the AC control voltage before the time delay expires;
detecting a predetermined minimum AC control voltage that exceeds a minimum startup voltage for a predetermined time duration after the time delay expires;
initiating a randomly generated time delay in response to detecting that the predetermined minimum AC control voltage exceeds the minimum startup voltage for the predetermined time duration; and
reactivating the motor at the expiration of the predetermined time duration and the randomly generated time delay.

9. The method of claim 8, wherein the time delay comprises an interval between 3 to 5 line cycles.

10. The method of claim 9, wherein the time delay is less than or equal to 50 milliseconds (ms).

11. The method of claim 10, wherein deactivating the motor comprises de-energizing a switching element that electrically connects the motor to the AC line voltage, the switching element being automatically de-energized if the AC control voltage is not detected as being greater than or equal to 18 volts before the time delay expires.

12. The method of claim 11, further comprising:
continuously measuring the AC control voltage every one or two line cycles during the time delay.

13. The method of claim 8, further comprising:
initiating the randomly generated time delay in response to detecting that the AC control voltage is at least 18 volts of control voltage for a minimum duration; and
reactivating the motor after the randomly generated time delay elapses.

14. A circuit for controlling operation of an air conditioning unit, comprising:
an alternating current (AC) low voltage source operable to selectively energize at least one switching element, the switching element electrically connecting a motor to a supply of an AC line voltage when the switching element is energized, the switching element being energized in response to a thermostat calling for the air conditioning unit to perform a cooling operation;
at least one sensor operable to monitor an AC control voltage supplied from the AC low voltage source, the AC control voltage being proportional to the AC line voltage; and
a controller operatively connected to the sensor and operable to control the supply of the AC line voltage to the motor in accordance with the AC control voltage supplied from the AC low voltage source, the controller being configured to initiate a time delay in response to the sensor detecting a predetermined reduction in the AC control voltage;
wherein the controller is configured to transmit a command to de-energize the switching element in order to discontinue operation of the air conditioning unit at the expiration of the time delay in response to the sensor not detecting a predetermined increase in the AC control voltage before the time delay expires; and
wherein, after expiration of the time delay and discontinuing operation of the air conditioning unit, the controller is configured to initiate a randomly generated time delay and transmit a command to re-energize the switching element in order to restart operation of the motor at the expiration of the randomly generated time delay in response to the sensor detecting a predetermined minimum AC control voltage that exceeds a minimum startup voltage for a predetermined time duration.

15. The circuit of claim 14, wherein the time delay comprises an interval between 3 to 5 line cycles.

16. The circuit of claim 15, wherein the time delay is less than or equal to 50 milliseconds (ms).

17. The circuit of claim 16, wherein the controller is configured to automatically de-energize the switching element if the sensor does not detect that the AC control voltage is greater than or equal to 18 volts before the time delay expires.

18. The circuit of claim 16, wherein the sensor continuously measures the AC control voltage every one or two line cycles during the time delay.

19. The circuit of claim 15, wherein the controller is configured to initiate reactivation of the motor in response to the sensor detecting that the AC control voltage is greater than or equal to 18 volts for the predetermined time duration.

20. The circuit of claim 19, wherein when the sensor detects that the AC control voltage is at least 18 volts of control voltage for the predetermined time duration, the controller is configured to re-energize the switching element such that the air conditioning unit is not reactivated until the randomly generated time delay elapses.

\* \* \* \* \*